United States Patent [19]

Jackson

[11] Patent Number: 4,617,721

[45] Date of Patent: Oct. 21, 1986

[54] JAW CHANGING APPARATUS

[75] Inventor: Joseph F. Jackson, Halifax, England

[73] Assignee: Pratt Burnerd International Limited, Halifax, England

[21] Appl. No.: 660,235

[22] Filed: Oct. 12, 1984

[30] Foreign Application Priority Data

Oct. 12, 1983 [GB] United Kingdom ............... 8327294

[51] Int. Cl.$^4$ .......................................... B23Q 3/155
[52] U.S. Cl. .................................... 29/568; 279/1 R; 279/5; 279/123
[58] Field of Search ................ 279/5, 123, 110, 1 R; 29/568

[56] References Cited

U.S. PATENT DOCUMENTS

| 2,873,822 | 2/1959 | Sloan ................................ 279/5 X |
| 3,021,149 | 2/1962 | Griffin .............................. 279/123 |
| 3,248,121 | 4/1966 | Volpe ............................ 279/123 X |
| 3,945,275 | 3/1976 | Ovanin .......................... 279/1 R X |
| 4,100,671 | 7/1978 | Junike et al. ...................... 29/568 |
| 4,313,252 | 2/1982 | Kuska et al. ...................... 29/568 |

FOREIGN PATENT DOCUMENTS

| 2610587 | 9/1977 | Fed. Rep. of Germany ........ 29/568 |
| 2813272 | 10/1979 | Fed. Rep. of Germany ...... 279/123 |
| 55-5273 | 1/1980 | Japan .................................... 29/568 |

Primary Examiner—Gil Weidenfeld
Assistant Examiner—Steven C. Bishop
Attorney, Agent, or Firm—Murray and Whisenhunt

[57] ABSTRACT

An apparatus is provided which enables the jaws of a chuck 10 to be removed from and inserted into jaw-ways 12, 13, 14 using a conventional workpiece handler, rather than a sophisticated and highly accurate dedicated jaw handling mechanism. A conventional workpiece handler cannot position a jaw to close tolerances but this problem is overcome by using a guide shoe 17 which can receive a jaw from the workpiece handler in any one of a range of positions and then accurately guide the jaw into one of the jaw-ways 12, 13, or 14.

A mechanism 16 is provided for releasing the jaws from the jaw-ways, and for re-locking the jaws in position.

22 Claims, 11 Drawing Figures

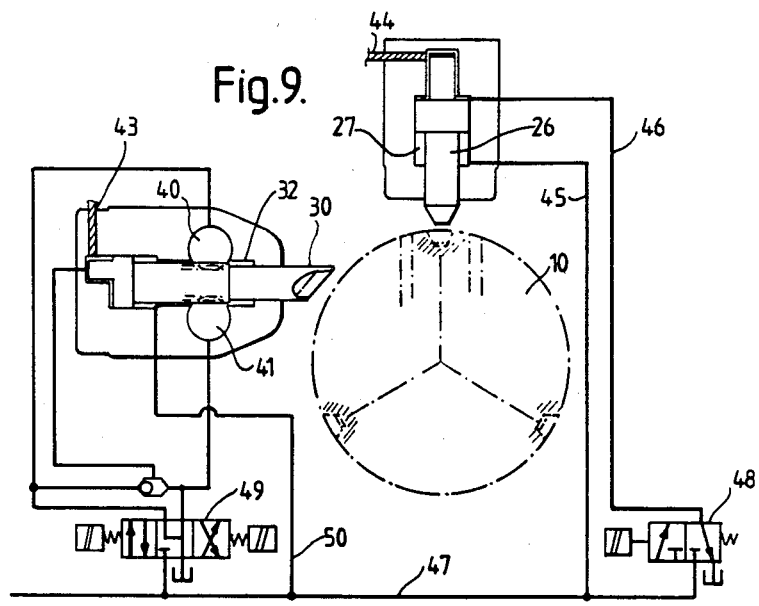
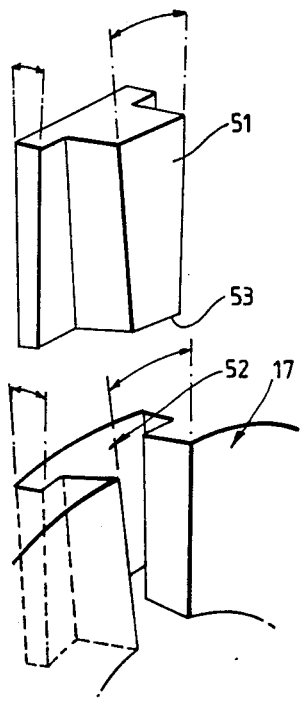

JAW CHANGING APPARATUS

BACKGROUND OF THE INVENTION

The invention relates to jaw changing apparatus for use with the chucks of machine tools.

DESCRIPTION OF THE PRIOR ART

It is frequently necessary to change the jaws of the chuck of a machine tool, in order to carry out different operations, and quick-change jaws are known, for example from our European Patent Application No. 82306569.3. Usually however the manipulation of the jaws is either manual or is carried out by means of a dedicated jaw handling mechanism which is expensive and restricts access to the machine tool.

OBJECT OF THE INVENTION

It is the object of the invention to provide apparatus which will enable the jaws of a chuck to be changed by means of a conventional workpiece handler, thus overcoming the problem of requiring a dedicated but expensive jaw handling mechanism.

A conventional workpiece handler is only required to position a workpiece between the open jaws of a chuck or to remove a workpiece from the jaws of a chuck, and high positional tolerances are not required. In order to position an interchangeable jaw in a chuck however, very high positional tolerances are required. It may for example be necessary to slide a T-shaped jaw into a T-shaped slot with great accuracy, and it may be necessary to locate the jaw to within 120 microns.

SUMMARY OF THE INVENTION

The invention provides, according to a first aspect, a chuck jaw changing apparatus for use in changing the jaw of the chuck of a machine tool, the apparatus comprising a guide shoe having an entry mouth arranged to accept a chuck jaw fed to it in any one of a number of positions within a given range, and a guiding portion arranged to guide the jaw to a given position after the jaw has entered the entry mouth.

The guide shoe may comprise part of the chuck body.

The guide shoe may have a tapered jaw-way co-operating with a tapered jaw.

Alternatively the guide shoe may be mountable adjacent to the chuck, and may have an exit mouth arranged to guide the jaw out of the shoe in a given position.

Preferably the guide shoe has a first abutment face against which a chuck jaw may be urged by a workpiece handler, and a second abutment face against which the jaw can be subsequently urged by the workpiece handler while maintaining contact between the jaw and the first abutment face.

When the jaw changing apparatus is for use with a jaw having a T-shaped part, the guide shoe preferably has a T-shaped slot therein, one side of the T-shaped slot being absent in the region of the entry mouth of the shoe, so that the jaw can first be moved in a first direction towards the base of the slot to abut the jaw with the base of the slot, can then be moved in a direction at right angles to the first direction to engage one of the arms of the T of the jaw in one of the arms of the slot, thus placing the T-shaped jaw fully in register with the T-shaped slot, and can further be moved in a third direction perpendicular to the first and second directions to move the jaw towards the exit mouth of the shoe.

Preferably the shoe has means to detect when a jaw has passed through the shoe.

Preferably location means are provided to locate the chuck in a position in which a chuck jaw is adjacent to the shoe.

The location means may comprise a plunger engageable in a recess in the chuck.

Preferably the plunger is tapered. The plunger may be mounted on the shoe.

When the jaw changing apparatus is for use with a chuck whose jaws are releasable by rotation of a release mechanism, for example as described in our co-pending European Patent Application No. 82306569.3, the invention also provides, according to a second aspect, means to rotate a jaw release mechanism, the rotation means comprising a release device which is movable in an axial direction to engage the release mechanism of the jaw and is then rotatable about its axis to release the jaw, the device being such that it cannot be retracted again in the axial direction until it has been rotated again to lock a fresh jaw into the chuck.

The release device may comprise a plunger and the plunger may have a screwdriver head.

Preferably the plunger is movable axially by applying compressed air or hydraulic fluid to the plunger.

Preferably the plunger is rotatable by applying compressed air or hydraulic fluid to at least one piston which has rack-like teeth engaging a toothed portion of the plunger.

Preferably the rear face of the plunger has a peg which engages with a recess when the plunger is in the retracted positions so that the plunger cannot rotate until it has been extended, and cannot subsequently be retracted until it has been rotated back to its starting position.

Other objects and advantages of the invention will become apparent from the following description of embodiments of the invention, given by way of example.

BRIEF DESCRIPTION OF THE DRAWINGS

FIG. 9 is a diagrammatic view of the chuck, jaw changing apparatus and jaw release mechanism of FIG. 1; illustrating the circuit diagram for the apparatus;

FIG. 11 is a perspective view of a jaw and guide shoe of yet another embodiment.

DETAILED DESCRIPTION OF THE EMBODIMENTS

Figure 1:
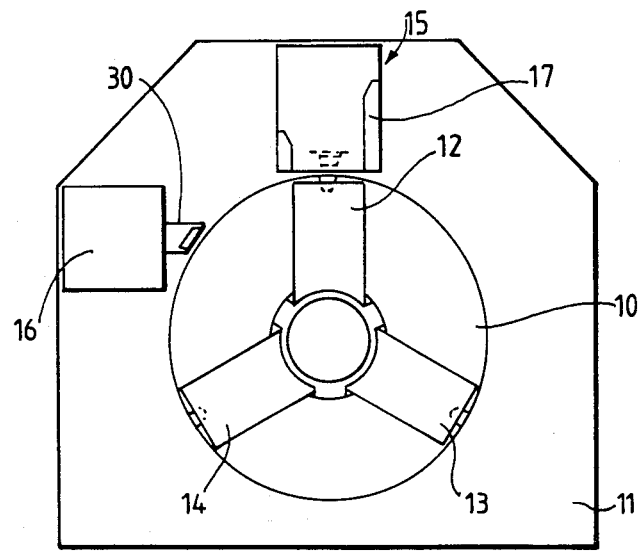
FIG. 1 is a front view of one embodiment of the invention, illustrating generally a chuck, jaw changing apparatus and jaw release mechanism, mounted on the headstock of a machine tool.

Referring firstly to FIG. 1, the apparatus according to the invention is used for a rotatable chuck 10 mounted on the headstock 11 of a machine tool (not shown). The chuck has three jaw-ways 12, 13 and 14 and the jaws are similar to those described in our European Patent Application No. 82306569.3. In other words by rotating a release device the jaws are freed from their actuating mechanism so that the jaws can be slid out of the chuck for replacement by sliding them radially outwardly along the T-shaped slots in which they are mounted.

The apparatus according to the invention comprises two principal components, namely a jaw changing apparatus 15 which also embodies a chuck location device, and a jaw release mechanism 16. Actual handling of the jaws is carried out by a conventional workpiece loading arm (not shown) mounted on an overhead gantry. The function of the jaw changing apparatus 15 is to guide a replacement jaw into the associated chuck jaw-way, as the jaw is moved in the requisite direction by the workpiece loader arm.

The function of the jaw release mechanism 16 is to release the jaw that is to be replaced, and to locate the new jaw when it has been placed in position.

Figure 2:
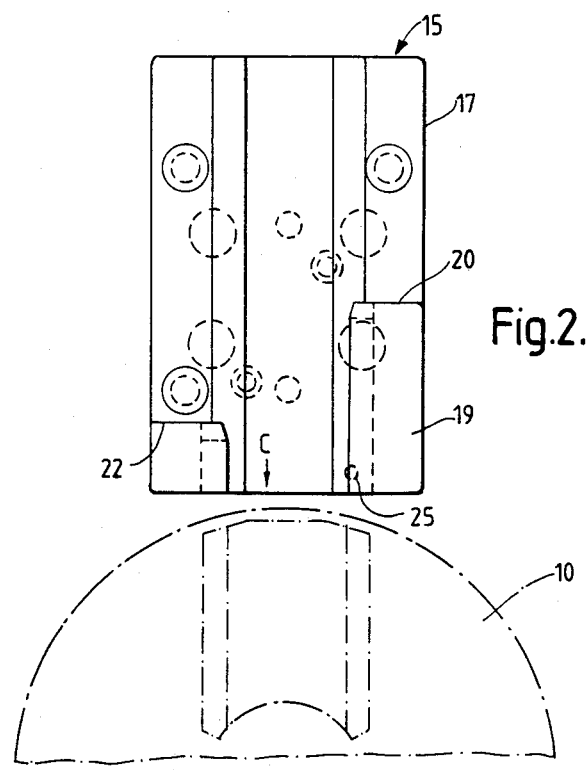
FIG. 2 is a more detailed front view of the jaw changing apparatus of FIG. 1.
Figure 3:
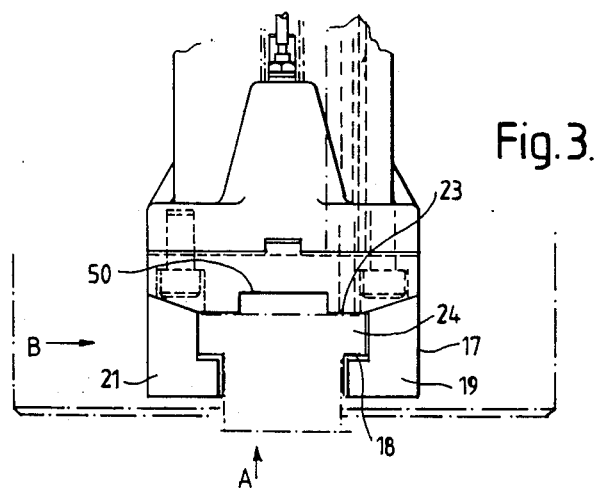
FIG. 3 is a plan view of the apparatus shown in FIG. 2.
Figure 4:
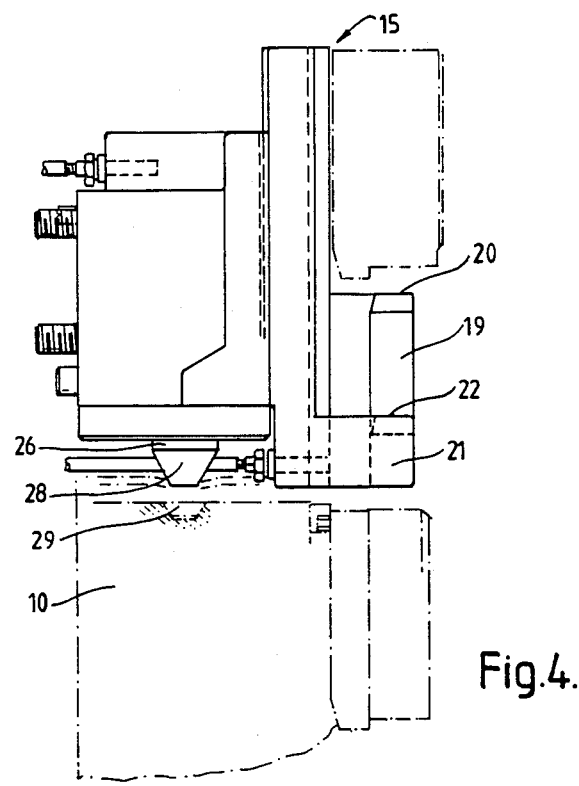
FIG. 4 is a side view of the apparatus shown in FIG. 2.
Figure 5:
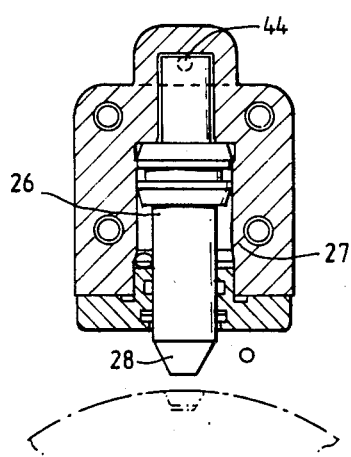
FIG. 5 is a front cross-section through chuck location means mounted on the rear of the apparatus shown in FIG. 2.

Turning now to FIGS. 3 to 5, the jaw changing apparatus 15 comprises essentially a guide shoe 17 which, as best shown in FIG. 3, defines a T-shaped slot 18. As best seen in FIG. 2, the side 19 of the shoe which defines the right-hand side of the slot 18 extends vertically to a point 20. On the other hand the side 21 which defines the left-hand side of the slot 18 extends only to a significantly lower point 22. This means that a T-shaped jaw can be located in the slot 18 by a series of three movements. Firstly the jaw is moved in the direction of arrow A of FIG. 3 until the base 23 of the jaw abuts the front face of the shoe. At this point the lowermost edge of the jaw will be at a level lying between 20 and 22. The jaw can then be moved by the loader arm in the direction of arrow B of FIG. 3 to cause the right-hand arm 24 of the jaw T to engage in the right-hand side of the T-shaped slot 18. This engagement brings the jaw into full register with the T-shaped slot 18 and the jaw can now be moved downwardly, perpendicular to the directions A and B, i.e. in the direction of arrow C of FIG. 2.

The shoe is provided with a proximity detector 25 which checks when a jaw has passed through the shoe.

If, when a jaw is slid out of the shoe through its T-shaped exit mouth, the jaw is to move smoothly into the jaw-way of the chuck, it is important for the jaw-way of the chuck to be accurately aligned with the slot in the shoe. For this purpose the chuck location mechanism is used and this comprises a plunger 26 which is shown in FIGS. 4 and 5. The plunger is mounted in a cylinder 27 attached to the rear of the shoe. The plunger has a tapered nose 28 and it can be extended by hydraulic fluid or compressed air to force the nose against the body of the chuck. As best seen in FIG. 4 the chuck 10 is provided with a tapered recess 29 adjacent each chuck jaw-way. When it is desired to change a jaw the chuck is stopped with the desired recess 29 substantially in register with the plunger 28 and subsequent extension of the plunger 28 causes the plunger to engage in the recess 29 and accurately locate the jaw-way adjacent the guide shoe.

Figure 6:
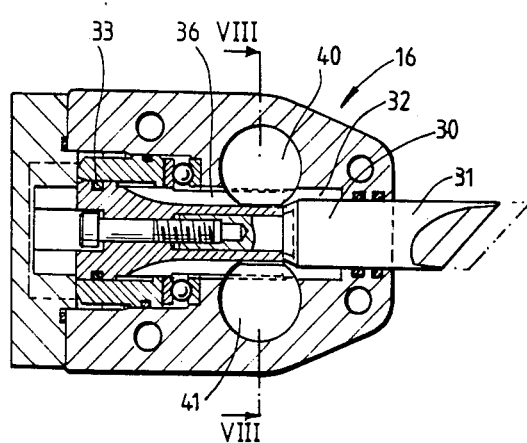
FIG. 6 is a front cross-sectional view through the jaw release mechanism of FIG. 1.
Figure 7:
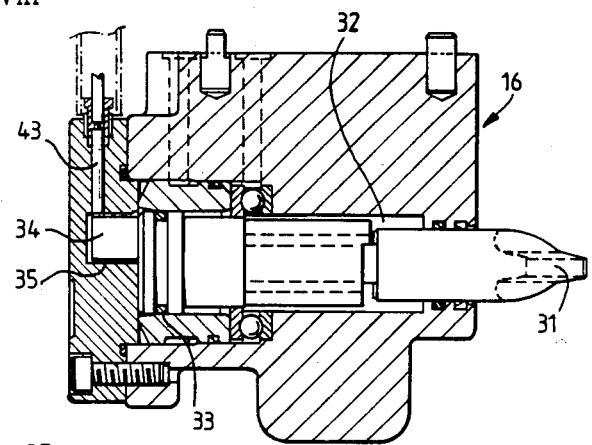
FIG. 7 is a plan view partially in cross-section of the mechanism shown in FIG. 6.
Figure 8:
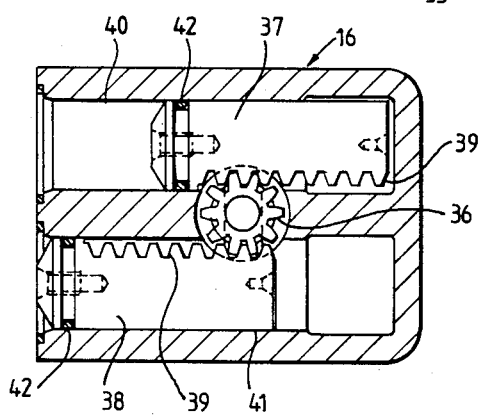
FIG. 8 is a cross-sectional view on line VIII—VIII of FIG. 6.

Turning now to FIGS. 6 to 8, it will be seen that the jaw release mechanism 16 essentially comprises a plunger 30 having a screwdriver type head 31 designed to engage with the release member of the chuck jaws (not shown). The plunger is mounted in a cylinder 32 and is sealed thereto by means of an O-ring 33. The plunger can be moved from its retracted position shown in FIGS. 6 and 7 to an extended position by the application of hydraulic fluid or compressed air. In the retracted position shown in FIGS. 6 and 7, a peg 34 on the rear of the plunger engages in a socket 35 as best seen in FIG. 7.

Means are provided to rotate the plunger. The periphery of the plunger is provided with splines 36 and these engage with two other plungers 37 and 38 (see FIG. 8) each of which has rack-like teeth 39 engaging with the splines 36. The plungers 37 and 38 are mounted in cylinders 40 and 41 which extend at right angles to the cylinder 32. O-ring seals 42 are provided and the application of compressed air or hydraulic fluid to the cylinders 40 and 41 causes the plungers 37 and 38 to move in such a way as to rotate the plunger 30. Because of the engagement of the peg 34 in the socket 35 however, the plunger 30 can only rotate when it is in the extended position. A proximity detector 43 is arranged to detect when the plunger is in the retracted position.

There is also a third proximity detector 44 (see FIG. 5) which detects when the plunger 26 of the chuck location apparatus is in the retracted position.

Turning now to FIG. 9 it will be seen that the cylinder 29 of the chuck location device is connected by lines 45, 46 respectively to a supply line 47 and a solenoid operated valve 48. It will be seen that as a fail safe device pressure is continually applied to line 45 acting to return the plunger 26 to the fully retracted position. To extend the plunger the solenoid operated valve 48 is actuated to also apply the supply pressure to the upper face of the plunger 26. Since there is a greater exposed area at this upper face there is a nett downward force which moves the plunger to its extended position.

The cylinders 32, 40 and 41 are interconnected as shown with the supply line 47 and a valve 49 operated by two solenoids. In the position shown pressure is applied through line 50 to maintain plunger 30 in the retracted position. The rear of cylinder 32 and the cylinders 40 and 41 are connected to exhaust by the valve 49.

The apparatus operates as follows:

Rotation of the chuck spindle is stopped with the chuck jaws in the workpiece loading position. The workpiece is gripped by the loading arm, the chuck jaws are opened and the workpiece is removed from the chuck by the workpiece loader.

To clear any swarf from the chuck prior to removing the jaws the chuck is then rotated at maximum spindle speed with a copious supply of coolant applied over the chuck body. The coolant is then turned off and the chuck is allowed to run for a short period prior to stopping the spindle and positioning a first jaw-way, for example jaw-way 12, substantially opposite the shoe 15.

The chuck jaws are then closed and the valve 48 is actuated causing the plunger 26 to extend and accurately position the chuck body relative to the guide shoe.

Valve 49 is then actuated by the right-hand solenoid causing pressure to be applied to the rear of cylinder 32. This produces a greater force on plunger 30 than is produced by the pressure applied via line 50 and the plunger 30 is accordingly extended to engage the release member of the chuck. As soon as the peg 34 clears the socket 35 pressure applied to cylinders 40 and 41 causes the plunger to rotate through 180° to release the chuck jaw.

The loading arm then engages the jaw (which may be provided with pick-up grooves to facilitate this) and extracts the jaw from the jaw-way. Proximity detector 25 detects that the jaw has moved from the chuck into the guide shoe.

The used jaw is then transported by the loading arm and is placed in a jaw storage area.

The appropriate jaw of the replacement set of jaw is then retrieved from the jaw storage area by the loader arm and is transported by the loader arm ready for insertion at the guide shoe. The jaw is engaged with the guide shoe as described above and is moved radially into the chuck jaw-way. The detector 25 detects that the jaw has moved out of the shoe and into the chuck. The loader arm then moves to pick up the second jaw of the replacement set.

Valve 49 is then moved in the reverse direction by the second solenoid. This causes the plunger 30 to rotate in the opposite direction to lock the new jaw in position and once rotation has been completed the plunger 30 retracts. The fact that retraction has taken place is detected by the detector 43.

The plunger 26 is then retracted and once again retraction is sensed, this time by the proximity detector 44.

The machine spindle position system then rotates the chuck to position a second jaw-way opposite the guide shoe and the plunger 26 is extended to accurately locate the second jaw-way relative to the guide shoe, thus commencing a repeat of the above described sequence. The sequence is repeated three times until all three jaws are changed.

After changing the last jaw retraction of the plungers 26 and 30 is checked and the spindle is rotated into the workpiece loading position. The chuck jaws are then opened and a new workpiece is loaded. The jaws close to grip the workpiece, the loading arm is removed and spindle rotation commences.

The proximity detector 44 is interlocked with the spindle drive to ensure that the machine spindle is inhibited from rotating when the plunger 26 is extended.

If a jaw is incorrectly engaged then the plunger 30 will not be able to rotate and hence will not be capable of being retracted. This will be sensed by the proximity detector 43.

To ensure that each jaw is only located in the associated jaw-way each jaw-way may be provided with a groove which is in a different position to the grooves of the other jaw-ways, and each jaw being provided with a pin which will only register with the groove of the correct jaw-way. The shoe 17, as shown in FIG. 3, has a slot 50 therein wide enough to accept all the pins.

Figure 10:
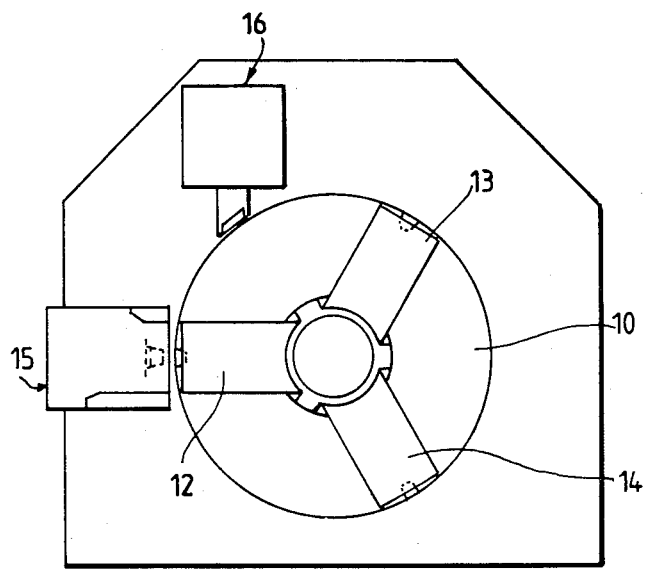
FIG. 10 is a view similar to FIG. 1 but showing an alternative embodiment.

Instead of using a loading arm mounted on an overhead gantry, the invention is equally applicable to the use of a loading arm mounted on a robot positioned adjacent to a machine tool. With such an arrangement the configuration shown in FIG. 10 may be used. The jaw changing apparatus 15 is positioned at the side of the chuck 10, instead of vertically above it, the jaws being withdrawn in the horizontal direction. The jaw release mechanism 16 is mounted as shown with the axis of plunger 30 vertical instead of horizontal. The operation of the second embodiment is identical to that of the first embodiment, the only difference being in the positioning of the jaw changing apparatus 15 and the jaw release mechanism 16. The configuration of the chuck 10 is slightly different, since the release member for a given jaw must be positioned clockwise of the jaw for the embodiment shown in FIG. 10, and anti-clockwise of the jaw for the embodiment shown in FIG. 1.

Turning now to FIG. 11, there is shown an alternative embodiment in which the guide shoe 17 actually comprises part of the chuck body. The guide shoe in fact comprises a tapered jaw-way into which a correspondingly tapered base jaw 51 can be inserted by a robot arm. The jaw-way tapers in two directions so that the entry mouth 52 is wider and thicker than the leading end 53 of the base jaw. This allows the robot arm a certain amount of tolerance when inserting the base jaw into the jaw-way. The precise position of the base jaw with respect to the jaw-way is not critical on entry.

Once the base jaw has been located in the mouth of the jaw-way however, the jaw-way provides progressively greater guidance.

Although the base jaw, once inserted into the chuck bod, will undergo a certain amount of radial movement for the purpose of clamping and unclamping a workpiece, the amount of radial movement, and the extent of the tapers, is such that there is little change in the clearance between the base jaw and the jaw-way over the working range of the jaw. In each of the directions of taper, the taper is 0.004 inches per inch. The height of the base jaw as viewed in FIG. 11 is 4 inches. This means that when the robot arm inserts the jaw in the jaw-way there is a clearance, in each of the two relevant directions, of 16 thousandths. Once the jaw is in its working position however, the clearance may be as little as 1 thousandth. The range of working movement of the jaw in this embodiment is ¼ inch and so, although the jaw is working in a tapered jaw-way, the clearance between the jaw and the jaw-way varies by only 1 thousandth over the working range of the jaw.

The invention is not restricted to the details of the foregoing embodiments. For example, in the embodiment shown in FIG. 11, it is not essential that the taper be 0.004 inches per inch. The taper may for example be from 0.002 inches per inch to 0.06 inches per inch.

I claim:

1. A changeable chuck jaw assembly for changing a jaw of a generally cylindrical chuck of a machine tool, said chuck having a chuck body, comprising the chuck body, a tapered jaw-way in the chuck body having a jaw mouth opening to the front of the chuck body and a recess behind and wider than the mouth, said jaw-way also having an entry mouth, with the jaw-way widest at the entry mouth, and a tapered jaw means for cooperating with the tapered jaw-way to enter the jaw-way even if not aligned with a preselected working position of the jaw means and to be guided to the preselected working position after entry into the entry mouth, said jaw-way and said jaw means each having a width and a depth which increase in the radially outward direction, said jaw means mounted for sliding radial working movement in the jaw-way.

2. Assembly of claim 1, wherein said jaw-way is T-shaped in cross-section.

3. Assembly of claim 1, further including a jaw release mechanism and means for releasing the jaws by rotation of said jaw release mechanism, said release means having first means movable in an axial direction to engage said jaw release mechanism, and then rotatable about its axis to release the jaw, and retraction prevention means for preventing said jaw release means from being retracted again in the axial direction until it has been rotated again to lock a fresh jaw into the chuck body.

4. Assembly of claim 3, wherein the jaw release means comprises a plunger.

5. Assembly of claim 4, wherein said plunger has a screwdriver head.

6. Assembly of claim 4, wherein the plunger is axially movable by the application of fluid pressure.

7. Assembly of claim 4, further including at least one piston, said piston having rack-like teeth, said plunger having a toothed portion thereof, said plunger being rotatable by applying fluid pressure to said piston to cause said rack-like teeth to engage the toothed portion of the plunger.

8. Assembly of claim 7, wherein the rear face of the plunger has a peg which engages with a recess when the plunger is in the retracted position so that the plunger cannot rotate until it has been extended, and cannot subsequently be retracted until it has been rotated back to its starting position.

9. A changeable chuck jaw assembly for changing a jaw of a chuck of a machine tool, comprising a chuck, a guide shoe mounted adjacent the chuck and having an entry mouth and an exit mouth, and a chuck jaw receivable in the chuck, said guide shoe having a first abutment face means for providing a surface against which the chuck jaw can be initially urged upon entry in the guide shoe entry mouth, and a second abutment face means for providing a surface against which the chuck jaw can be urged by movement generally parallel to said first abutment face means and while maintaining contact with said first abutment face means, and for providing a surface along which said chuck jaw can be moved in a direction generally parallel to said second abutment face means while maintaining contact with said second abutment face means to pass through said exit mouth to said chuck, said second face means being generally transverse to said first face means.

10. Assembly of claim 9, wherein said chuck jaw has a T-shape in cross-section, and said guide shoe has a T-shaped slot therein, one side of the T-shaped slot being absent from the region of the guide shoe entry mouth.

11. Assembly of claim 9, wherein the guide shoe includes means for detecting when a jaw has passed through the shoe.

12. Assembly of claim 9, including location means to locate the chuck in a position in which a chuck jaw is a adjacent to the guide shoe.

13. Assembly of claim 12, wherein said location means comprises a plunger and a recess in the chuck, said plunger engageable in said recess.

14. Assembly of claim 13, wherein said plunger is tapered.

15. Assembly of claim 13, wherein said plunger is mounted on the guide shoe.

16. Assembly of claim 9, further including a jaw release mechanism and means for releasing the jaws by rotation of said jaw release mechanism, said release means having first means movable in an axial direction to engage said jaw release mechanism, and then rotatable about its axis to release the jaw, and retraction prevention means for preventing said jaw release means from being retracted again in the axial direction until it has been rotated again to lock a fresh jaw into the chuck body.

17. Assembly of claim 16, wherein the jaw release means comprises a plunger.

18. Assembly of claim 17, wherein said plunger has a screwdriver head.

19. Assembly of claim 17, wherein the plunger is axially movable by the application of fluid pressure.

20. Assembly of claim 17, further including at least one piston, said piston having rack-like teeth, said plunger having a tooth portion thereof, said plunger being rotatable by applying fluid pressure to said piston to cause said rack-like teeth to engage the tooth portion of the plunger.

21. Assembly of claim 17, wherein the rear face of the plunger has a peg which engages with a recess when the plunger is in the retracted position so that the plunger cannot rotate until it has been extended, and cannot subsequently be retracted until it has been rotated back to its starting position.

22. A changeable chuck jaw assembly for changing a jaw of a generally cylindrical chuck of a machine tool, said chuck having a chuck body, said chuck body having at least one jaw-way and at least one jaw insertable into the jaw-way and mountable in a working position for sliding radial working movement in the jaw-way, and guide means defining an entry path for guiding said jaw from entry in said guide means to said working position, said guide means providing a degree of the freedom of movement of the entire jaw in a direction perpendicular to the direction of movement of the jaw along the path which decreases as the jaw moves along the entry path.

* * * * *